INVENTOR.
Hans Jakobs,
BY Parker & Carter
Attorneys.

INVENTOR.
Hans Jakobs,
BY Parker & Carter
Attorneys.

INVENTOR.
Hans Jakobs,
BY Parker & Carter
Attorneys.

United States Patent Office 3,124,530
Patented Mar. 10, 1964

3,124,530
FILTER
Hans Jakobs, Chicago Heights, Ill., assignor to Novo Industrial Corporation, a corporation of New York
Filed Nov. 27, 1959, Ser. No. 855,710
2 Claims. (Cl. 210—389)

This invention is in the field of filtering devices for dewatering or removing the water or moisture from wet material.

A primary object of the invention is an apparatus for dewatering wet material that greatly increases production or capacity over anything known.

Another object is a dewatering or filtering apparatus for dewatering moist material which insures an accurate moisture content in the final product.

Another object is a filtering apparatus with a greatly simplified discharge.

Another object is a dewatering apparatus that will not clog or blind.

Another object is a filtering apparatus which uses high frequency oscillations.

Another object is a filtering apparatus which may be easily adjusted and accurately set to give the precise degree of dewatering desired.

Another object is a filtering apparatus which may be used for either wet or dry material.

Another object is a filtering apparatus which may be used for dewatering, for dry separation, or for washing.

Other objects will appear from time to time in the ensuing specification and drawings in which.

Figure 1:
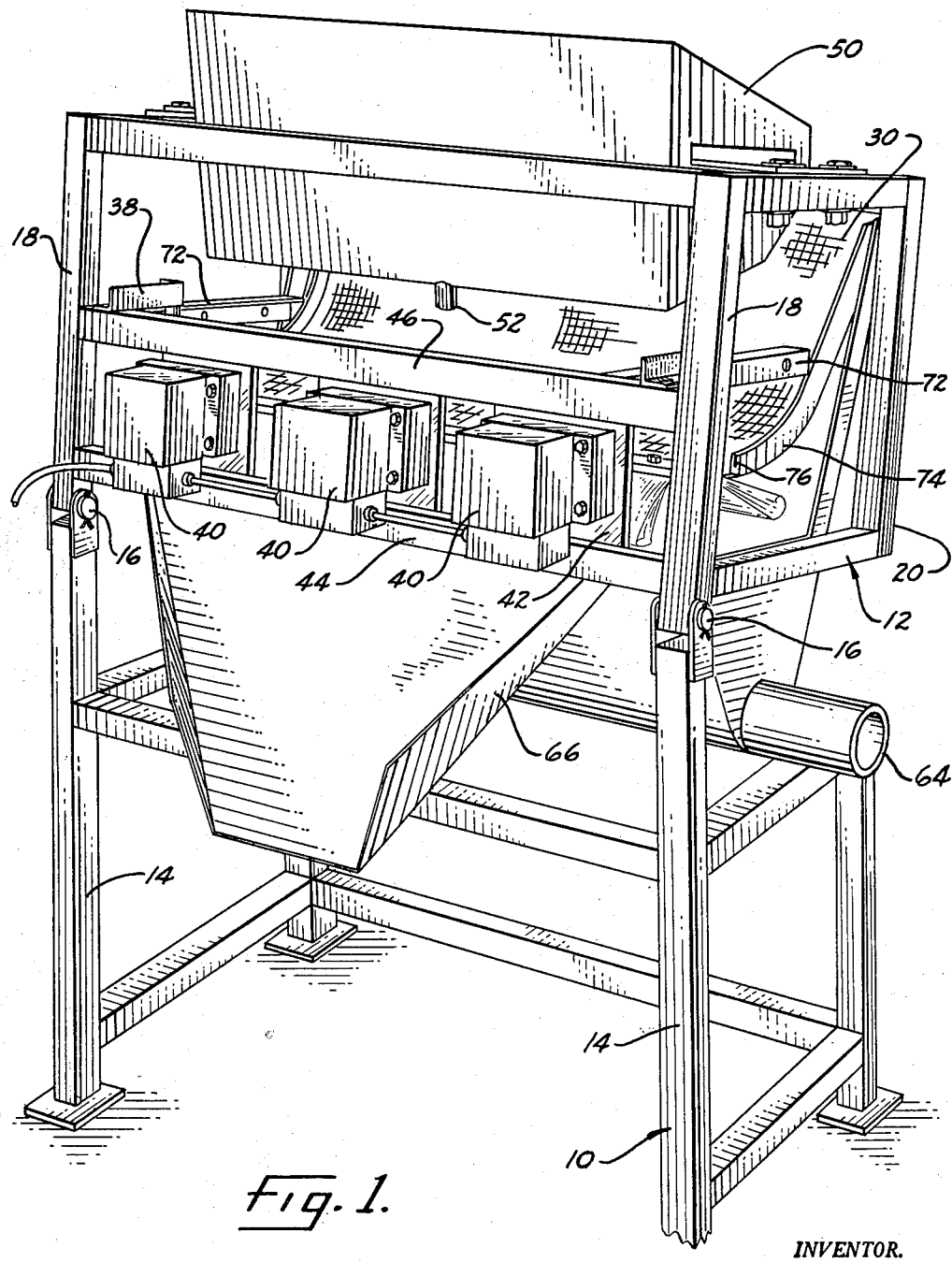
FIGURE 1 is a perspective of the front of the machine.
Figure 2:
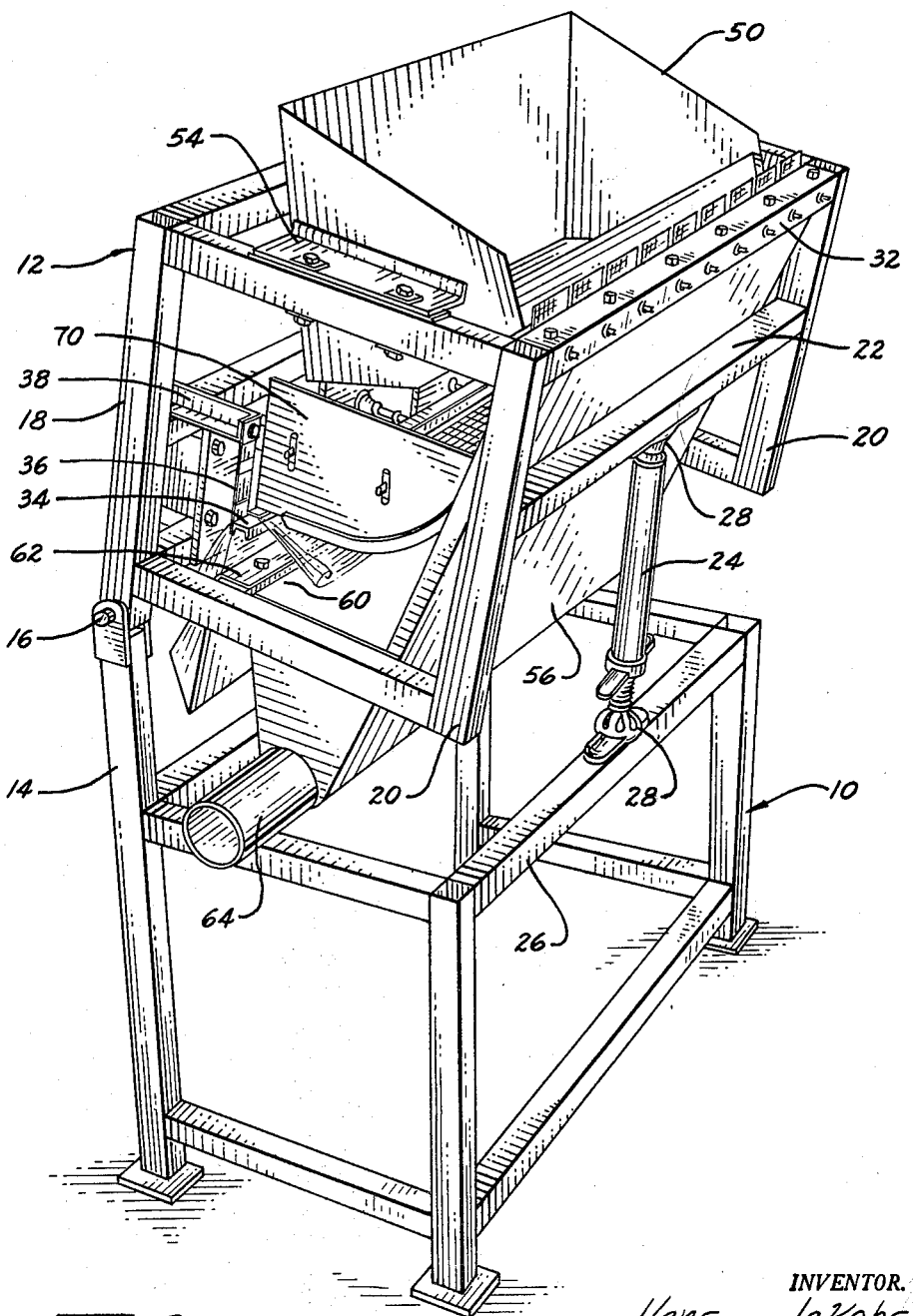
FIGURE 2 is a perspective of the back of the machine.

In FIGURES 1 and 2, the unit has been shown as including a base 10 made up of interconnected tubes providing a stable support for an upper frame 12. It will be noted that the two front legs 14 of the base extend up somewhat above the rest of the base and are connected by pivots 16 to the front tubes 18 of the frame. The frame has rear tubes 20 interconnected by a rear crosspiece 22. An adjustable jack or turnbuckle 24 is connected between the rear crosspiece 22 of the frame and a rear piece 26 on the base, with ball and socket joints 28 at each end so that the frame may be pivoted about 16 to any tilted position.

Figure 3:
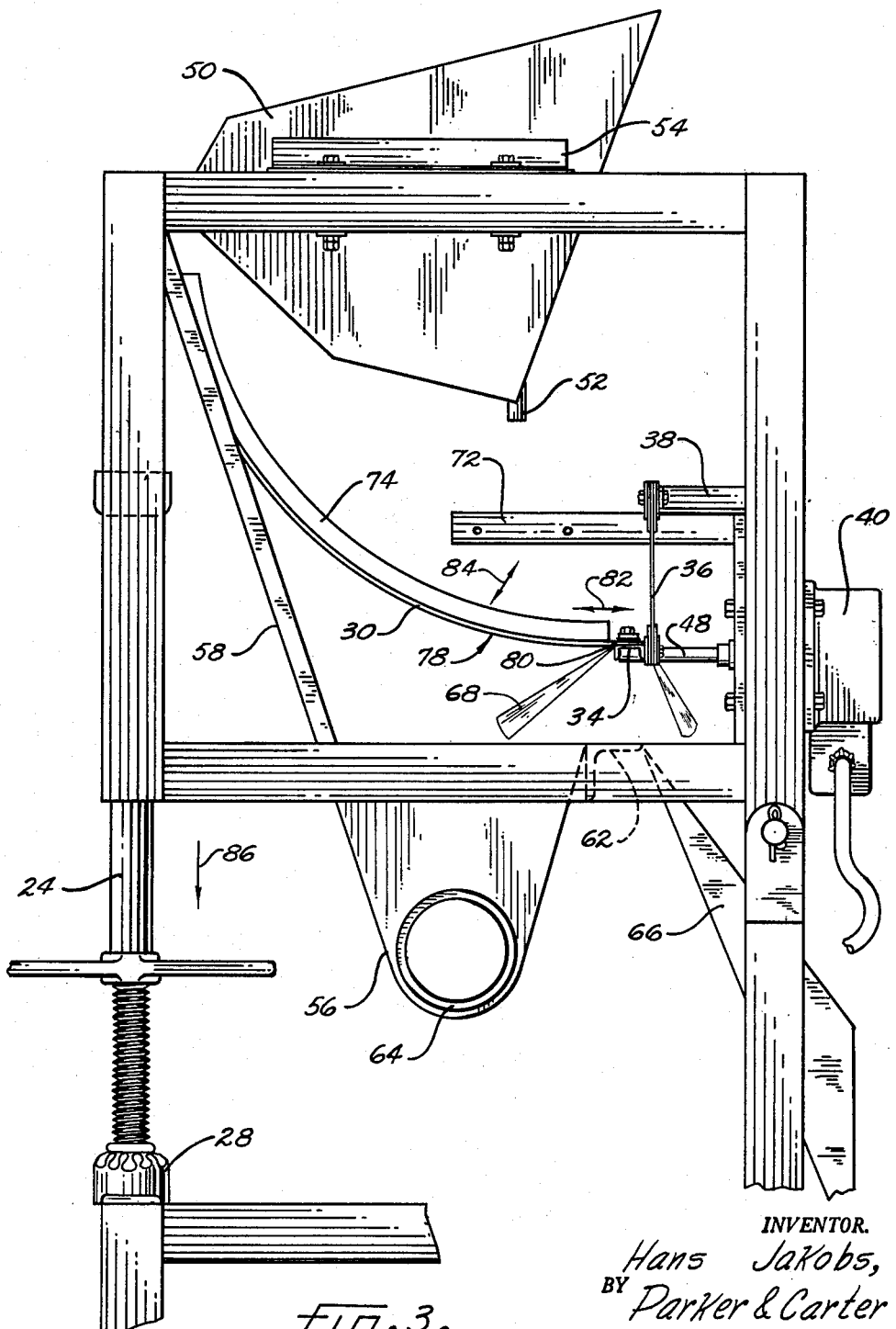
FIGURE 3 is a side view of the machine, on an enlarged scale.

As shown in FIGURES 1, 2 and 3, a flexible screening mesh or cloth 30 is freely supported by the frame in an inclined and slightly sagging position with its upper end releasably clamped to a rear crossbar 32 and its lower end releasably clamped to a channel or a bar 34. On each side I support the crossbar 34, and therefore the lower end of the filtering mesh, by springs 36, shown in this case as leaf springs, each of which may be suitably connected to a bar 38 on each side of the frame.

Figure 4:
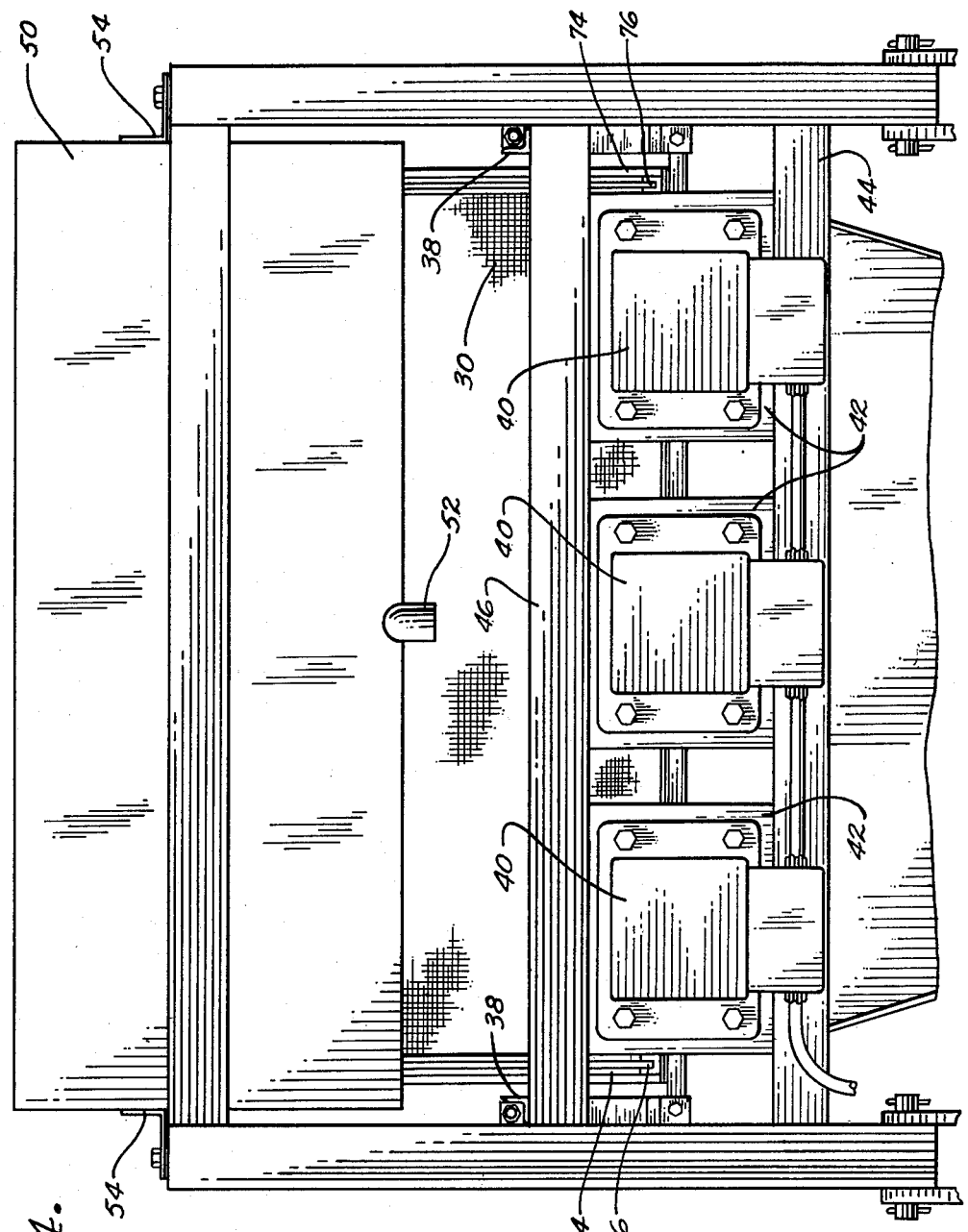
FIGURE 4 is a front view of FIGURE 3.

As best shown in FIGURES 1 and 4, I provide a vibrating or oscillating mechanism on the front of the frame, shown in this case as three spaced vibrating heads 40, each being mounted on a plate 42 connected between a lower and an intermediate crossbar 44 and 46 on the front of the frame. The vibrators or oscillators may be of the electromagnet type which generate fundamental oscillations, preferably having superimposed harmonics of higher frequency, reaching into the sonic range or range of sound. An electromagnet vibrator of this general type is shown in U.S. patent application Serial No. 782,223, filed December 22, 1958, and now Patent No. 3,039,012, issued June 12, 1962. Rods 48 extend from each of the vibrators and are connected to the crossbar 34. The oscillators are interconnected and, as a group, are connected to a suitable source of electric current and operated so that the vibrations are in phase and at the same frequency. It should be understood that one or any number of vibrators may be used, but a plurality may be desired depending upon the width of the mesh.

Wet material to be dewatered or filtered may be fed to an upper hopper 50, on top of the frame, which is open on top and funnels down to a centrally disposed outlet 52 which, as noted in FIGURE 3, drops the wet or moist material in an intermediate location or area on the mesh. The hopper may be suitably attached to the top of the frame by brackets 54, one on each side.

The material on the mesh is subjected to the dewatering action of the vibrating mesh, as set forth in detail hereinafter, and the separated water passes through the mesh and is collected in a lower trough 56, the rear edge 58 of which extends back up toward the rear and top of the frame and is connected to crossbar 32 on the frame under the upper edge of the mesh. The front edge 60 of the water collecting trough, as shown in FIGURE 2, is connected to a suitable crosspiece 62 on the frame. The water collecting trough may have a side discharge or spout 64 or it may be from the center or elsewhere.

The solid material dewatered by the mesh moves down and over the lower or front edge of the mesh on the bar 34 and then falls down a chute 66 which may be funnel shaped to bring the material to a suitable collector or conveyor. Chute 66 is also connected to the crossbar 62 on the frame. It should be noted that the water collecting trough 56 has its front edge connected to crossbar 62 while the material collecting chute or trough 66 has its rear edge connected to the crossbar 62. As a matter of fact, the crossbar 62 may be considered the point of division and is located more or less directly under the lower or front edge of the screening mesh, under 34. To insure an accurate separation of the solids from the liquid, I may pass a flexible piece of plastic 68 through the clamp connection on bar 34 for the lower end of the filter mesh and allow a length of the plastic sheet on each side of the connection to hang freely, as possibly best shown in FIGURE 4, to curtain each side of the separation bar 62 between trough 56 and chute 66 so that material or liquid will not splash through the gap between bars 34 and 62.

To prevent material from flowing off either edge of the mesh, I provide side plates 70 which are suitably mounted by bolts or the like on an angle 72 extending rearwardly from crossbar 46 on the front of the frame. It will be noted that the lower edge of the side plates is arcuate and conforms somewhat to the diagonal sloping contour of the mesh. I attach a flexible strip of rubber 74 or the like along each edge of the mesh, such rubber strip having an upwardly opening slot 76, as shown in FIGURE 1. The side plate 70 has been removed in FIGURE 1 and it will be understood that when the plate is in place, as in FIGURE 2, it projects partially into slot 76 in the rubber strip to form a seal. A certain spacing should be provided between the bottom of the slot and the lower edge of the side plate so as not to interfere with the vibrations imparted to the mesh by the electromagnetic heads or impellers.

The particular side sealing arrangement shown and described may be varied somewhat. For example, instead of having a stationary plate projecting into a slot in a rubber strip attached to the filter mesh, I might connect the edge of a plastic sheet to the sloping edge of the mesh, then turn the sheet upwardly and connect it to the top of the frame at or near the upper hopper 50. Such a sheet should be highly flexible so that it will not dampen out the vibrations in the mesh. At the same time, the sheet would form a positive leakproof seal for both ends or sides of the mesh which, in many situations, is highly desirable.

I have shown and referred to electromagnets as the vibrators, but it should be understood that vibrations could be imparted to the lower edge of the mesh by an eccentric rotor or any other suitable mechanical vibrator which would provide the frequencies desired.

Also, where a fine mesh screen is being used, such a screen will normally be far too flexible to transmit the vibrations up the mesh sufficiently. For example, I have found that in screen sizes running from 400 mesh for a 32 micron separation up to about 30 mesh for a 600 micron separation, the screen is too flexible and I provide a back-up which may take the form of a perforate plate made of a relatively light gauge metal, for example 16 gauge, which may be placed under the fine mesh screen and connected to it. In such a situation I prefer that the mesh be fully and completely bonded to it, such as by a plastic vinyl coating interface on the perforate plate with the screen heat sealed to it. The advantage of bonding the two together is that no friction will be developed between them, whereas if they are totally free with the screen resting on or supported by the plate and directly next to it, friction will quickly wear out the screen. I have referred to vinyl as the coating or adhesive, but I might use a rubber base adhesive or an epoxy. The holes in the perforate plate could be in any suitable pattern. The importance of the back-up plate is that it will transmit the vibrations up through the mesh, whereas the fine screen alone will not.

In certain situations, I may use two perforate plates, one above and the other below the fine mesh, all bonded together with the holes in the plates aligned. Such a perforate plate normally has about 58% of its surface open areas, which is satisfactory, and in certain situations the plate alone may be used without the mesh, for example for a quite coarse separation.

The use, operation and function of the invention are as follows:

A filter mesh or sieve or screen is disposed in an inclined position and is supported at its upper and lower edges. The mesh is somewhat longer than the direct distance between its two support points so that there is a slight sag. High frequency vibrations or oscillations are imparted to the mesh in a direction generally parallel to its lower end or edge and material is fed by gravity or otherwise to an intermediate area a distance up the sloping surface of the mesh.

Consider for the moment in FIGURE 3 that the material to be filtered or dewatered is fed to the mesh more or less at point 78. The oscillations or vibrations imparted to the lower end 80 of the mesh will cause the lower end to oscillate back and forth in its own plane. Such oscillations might be referred to as longitudinal and are represented by arrow 82 in FIGURE 3. Due to the inclined and sagging disposition of the mesh, the oscillations at the intermediate area 78 of the mesh will be at a pronounced angle to the general plane of the mesh at that point, as represented by arrow 84. It will be noted that oscillations 84 will have both a vertical and a horizontal component or vector which is to say that such oscillations will have both a filtering and a transporting effect. It might be said that oscillations 84 in the intermeditae area of the mesh primarily have a filtering effect with some transportation, whereas oscillations 82 at the lower end of the mesh primarily have a transportation effect with some and possibly a minor amount of filtering or dewatering.

The result is that as the wet material is fed to the intermediate area 78, it will be subjected to the highest filtering effect. Due to the somewhat lesser transportation effect of the vibrations in that area and also gravity, the material will also be transported toward the lower end. As the moist material moves down the mesh toward the lower end, the filtering effect diminishes and the transportation effect increases. The dewatered solids will move over the lower edge or bar 34 and then will fall onto chute 66. The water passing through the filter mesh will be collected by trough 56 and discharged separately.

The inclination or degree of tilt of the mesh may be varied by tilting the entire frame. In FIGURE 3, the frame has been shown in a horizontal position, but the left edge may be lowered to tilt the entire frame in accordance with arrow 86. The result is that the filter mesh will have less inclination between the upper and lower ends and the wet material will stay on the mesh longer before it passes over the lower end of the mesh. By tilting the mesh, the degree of dewatering may be increased and the solids may be made drier when discharged. But this is governed by the moisture content desired in the final product and also by the capacity desired from the unit. When the frame is tilted to a substantial degree, the material at the lower end 80 of the mesh might have to travel uphill somewhat. But this can be done, depending upon the degree of dewatering desired. If more water is to be taken out of the material, the frame is tilted so that the angle of inclination of the mesh is reduced, and vice versa.

The invention has the advantage that material to be filtered may be fed to the mesh and deposited all the way across, from one side to the other. Dried solids may be discharged over the full width of the lower end of the mesh. In fact, the capacity of a unit according to the invention may be increased by merely making the machine and mesh wider. Moist material on top of the mesh may build up to a substantial depth, depending upon the inclination of the mesh, and will be held on the mesh and prevented from spilling over the sides by the side plates 70 and seals 74.

Figure 5:
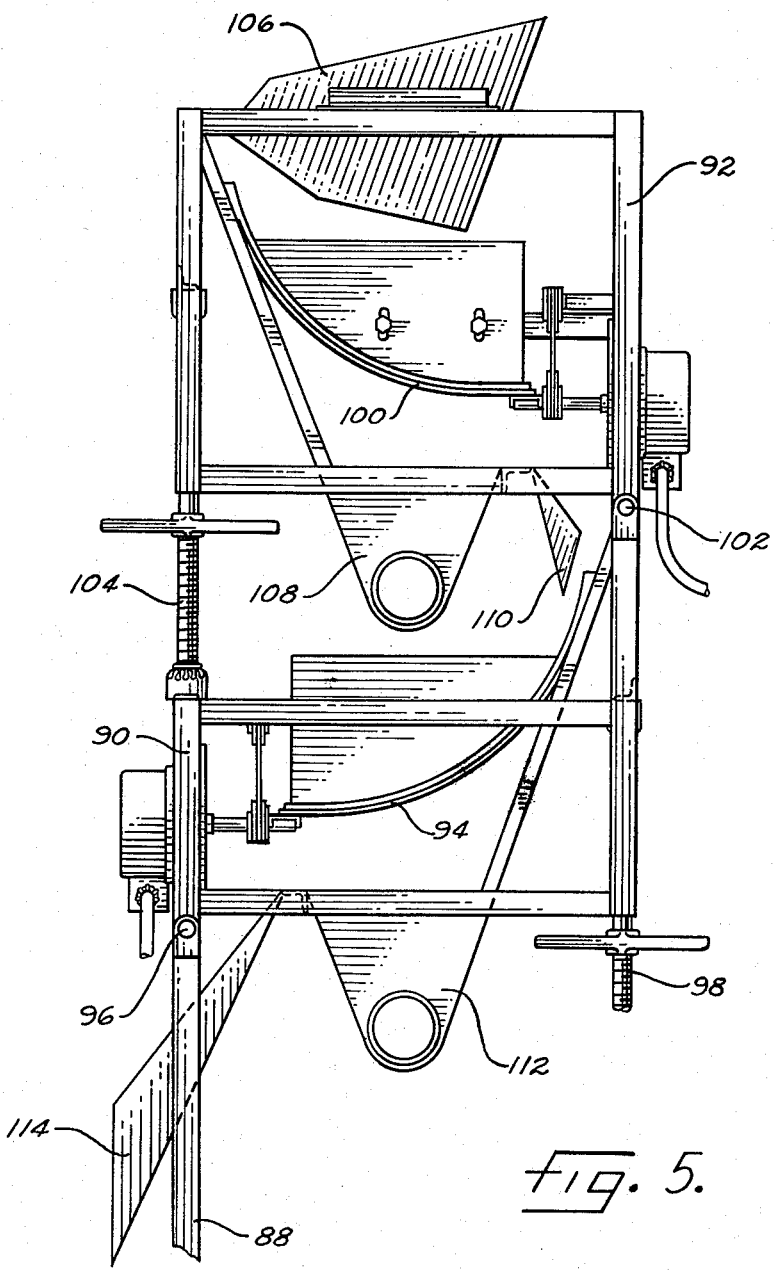
FIGURE 5 is a side view of a modified form.

In FIGURE 5, a multiple unit has been shown in which a base 88 supports a first frame 90 which in turn supports a second frame 92. The inclination of the inclined mesh 94 on the first frame may be varied through the front pivot 96 and jack arrangement 98 while the inclination of the second mesh 100 may be varied, but in the opposite direction, by the pivot 102 and jack arrangement 104. Material to be dewatered is first fed to the inlet trough or chute 106 on top of the second frame and the water separated from it is separately dicharged, as at 108. The partially dried solids pass from the discharge chute 110 directly to the screening or filtering mesh 94 of the second unit. The water removed in the second unit is separately discharged at 112 and the dried solids are taken by a chute 114. Each unit may have vibrators and spring suspension for the lower edge of the mesh, the same as in FIGURES 1-3. The lower mesh 94 may be somewhat more fine than the upper mesh 100. In fact, more than two such units may be stacked up. The inclination of each upper unit would have to take into consideration the inclination previously imparted to each unit below it.

The FIGURE 5 arrangement may be used as a washer, for example for salt. In that case I would position fine sprays above both meshes and also at the discharge of the upper mesh so that a double or two step washing action would take place. The size of the mesh for each unit would be the same. Or a unit such as shown in FIGURE 5 could be used strictly for dewatering or for dry separation. In fact, all of the units shown and described could be used in a totally dry operation for scalping.

While I have shown and described the preferred form and suggested one modification of my invention, it should be understood that suitable additional modifications, changes, substitutions and alterations may be made. For example, instead of attaching the vibrators directly to the lower end of the mesh, I might attach them at some intermediate point and a resonant condition could be set up in the springs 36 and crossbar 34 at the lower end of the mesh. But I prefer the arrangement shown. With these and other modifications in mind, the invention should be unrestricted, except as by the appended claims.

I claim:

1. In a filter, a support, a flexible filter mesh positioned on the support in an inclined position with a degree of slack between the upper and lower ends thereof and the inclined side edges being free and otherwise directly unsupported, the upper end of said mesh being fixed on the support, the lower end of said mesh and a substantial portion of the extent of the mesh directly adjacent the lower end extending generally horizontally, means for supporting the lower end of said flexible mesh including a vibrator on the support attached to the lower end of the mesh whereby the lower end of the mesh is free to move with respect to and independently of the support, the vibrator being constructed and attached to the lower end of the mesh to apply vibrations thereto only in a direction generally parallel to the plane of the lower end for simultaneously creating generally perpendicular vibrations in an intermediate area of the mesh due to the instantaneous variations in said degree of slack and generally parallel vibrations at the lower end, an inlet on the support above the mesh for feeding material to be filtered to the intermediate area, a discharge on the support below the lower end of the mesh for receiving separated material discharged over the lower end of the mesh, and a flexible side seal attached to the support and disposed along each inclined side edge of the mesh rising a substantial distance above it and constructed to prevent material from flowing over the side edges thereof thereby creating a substantial depth of material in the mesh without substantially dampening or otherwise hindering the vibrations generated in the mesh so that all separated material will be confined to movement only over the lower end of the mesh after separation.

2. The structure of claim 1 further characterized by and including means for adjusting the over-all inclination of the filter mesh so as to vary the dewatering effect thereof.

References Cited in the file of this patent

UNITED STATES PATENTS

| | | |
|---|---|---|
| 440,883 | Noble | Nov. 18, 1890 |
| 1,459,838 | Mitchell | June 26, 1923 |
| 1,779,454 | Traylor | Oct. 28, 1930 |
| 2,008,648 | Symons | July 16, 1935 |
| 2,192,279 | Symons | Mar. 5, 1940 |
| 2,204,379 | Overstrom | June 11, 1940 |
| 2,651,419 | Overstrom et al. | Sept. 8, 1953 |
| 2,682,338 | Hurst | June 29, 1954 |
| 2,984,622 | Bruninghaus | May 16, 1961 |

FOREIGN PATENTS

| | | |
|---|---|---|
| 493,600 | Great Britain | Oct. 11, 1938 |